(12) United States Patent
Musashi et al.

(10) Patent No.: US 7,779,809 B2
(45) Date of Patent: Aug. 24, 2010

(54) THROTTLE SYSTEM AND SENSOR UNIT

(75) Inventors: Kazuhiro Musashi, Odawara (JP);
Noriaki Takagi, Odawara (JP); Osamu Miura, Odawara (JP)

(73) Assignee: Mikuni Corporation, Tokyo (JP)

( * ) Notice: Subject to any disclaimer, the term of this patent is extended or adjusted under 35 U.S.C. 154(b) by 95 days.

(21) Appl. No.: 11/597,209

(22) PCT Filed: May 26, 2005

(86) PCT No.: PCT/JP2005/009640

§ 371 (c)(1),
(2), (4) Date: Aug. 28, 2008

(87) PCT Pub. No.: WO2005/116429

PCT Pub. Date: Dec. 8, 2005

(65) Prior Publication Data
US 2009/0007883 A1    Jan. 8, 2009

(30) Foreign Application Priority Data
May 26, 2004  (JP) .............................. 2004-156335

(51) Int. Cl.
*F02D 9/08*     (2006.01)
*G01M 15/00*    (2006.01)
*F02B 37/12*    (2006.01)

(52) U.S. Cl. ................................... 123/337; 73/114.37

(58) Field of Classification Search ................. 123/337, 123/378, 399; 73/114.16, 114.18, 114.37
See application file for complete search history.

(56) References Cited

U.S. PATENT DOCUMENTS 5,704,335 A * 1/1998 Akutagawa et al. ......... 123/337
5,711,271 A   1/1998 Schlagmueller et al.
6,453,886 B2 * 9/2002 Takano et al. ............... 123/520
7,044,106 B2 * 5/2006 Kojima et al. .............. 123/337

FOREIGN PATENT DOCUMENTS

| JP | 58-66034 | | 4/1983 |
|---|---|---|---|
| JP | 2-240971 | | 9/1990 |
| JP | 3-10236 | | 1/1991 |
| JP | 7-16136 | | 3/1995 |
| JP | 8-277733 | | 10/1996 |
| JP | 09250374 A | * | 9/1997 |
| JP | 9-264167 | | 10/1997 |
| JP | 10-512032 | | 11/1998 |
| JP | 2004-28797 | | 1/2004 |
| JP | 2004028797 A | * | 1/2004 |

* cited by examiner

Primary Examiner—Stephen K Cronin
Assistant Examiner—Sizo B Vilakazi
(74) Attorney, Agent, or Firm—Wenderoth, Lind & Ponack, L.L.P.

(57) ABSTRACT

A sensor unit includes a unit main body mounted on a throttle device, and a pressure sensor chamber that is provided at the unit main body and that accommodates an intake pressure sensor to detect an intake pressure through an intake pipe. The pressure sensor chamber is divided by a partition into a pressure receiving area to receive a pressure in the intake pipe and a pressure detecting area to detect the pressure by the intake pressure sensor, such that the pressure receiving area communicates with the pressure detecting area through a communication portion. A foreign substance is prevented from flowing into the intake pressure sensor when guiding air in the intake pipe to the intake pressure sensor, thereby improving detection accuracy by the intake pressure sensor.

14 Claims, 5 Drawing Sheets

THROTTLE SYSTEM AND SENSOR UNIT

BACKGROUND OF THE INVENTION

1. Field of Invention

The present invention relates to a sensor unit incorporating a sensor to detect various data, which is indispensable for fuel supply control and intake airflow control of an internal combustion engine (particularly, an intake pressure sensor to detect an intake pressure to an internal combustion engine), and a throttle system provided with this sensor unit.

2. Description of the Related Art

Recently, an internal combustion engine of an automobile including a motorcycle (hereinafter, referred to an "engine") has been generally controlled by an electronic control device of an engine on which a computer is mounted.

In an electronic control device of an engine, various sensors to detect operation state or intake state of the engine all the time are arranged at the engine or its peripheral devices, and an electronic control unit (ECU) that electronically performs centralized control of the engine controls the engine optimally based on various data sent from these various sensors.

An engine generates a rotational torque by combusting in a piston, an air/fuel mixture in which a fuel such as gasoline is mixed with air. Therefore, it is important to optimize not only control of fuel supply amount on the engine but also control of intake airflow rate.

In general, an intake airflow supplied to an engine is controlled by a throttle device provided on an intake pipe side connected to an engine. This throttle device controls the airflow by providing a throttle valve inside a cylinder pipe for intake and by adjusting an opening degree of this throttle valve.

Therefore, the ECU needs to accurately detect the opening degree of the throttle valve in the throttle device for intake all the time. The ECU detects this opening degree of the throttle valve based on an output signal from a throttle position sensor (hereinafter, referred to a "TPS") provided near the throttle valve.

The ECU needs to detect a pressure of air sucked in through an intake pipe for optimal operation of an internal combustion engine in addition to the detection of the opening degree of the throttle valve. In general, such a detection of the intake pressure is performed by an intake pressure sensor provided directly at the intake pipe or at a separate pipeline leading to the intake pipe (refer to, for example, Patent Document 1). When the pressure of the air sucked in through the intake pipe is to be detected by the intake pressure sensor, it is necessary to guide the air in the intake pipe to the intake pressure sensor.

Patent Document 1: Japanese Patent Laid-Open Publication No. H10-512032

BRIEF SUMMARY OF THE INVENTION

However, in the above conventional technology, if a foreign substance flowing through the intake pipe flows to the intake pressure sensor with air when the air in the intake pipe is guided to the intake pressure sensor, detection accuracy by the intake pressure sensor might be reduced. Particularly, when a gasified fuel component enters the intake pipe and the fuel component causes moisture by condensation or the like, such moisture flows to the intake pressure sensor and can adversely affect pressure measurement by the pressure sensor.

The present invention has been made in view of the above current situation and has an object to provide a sensor unit which can prevent a foreign substance from flowing to an intake pressure sensor when guiding air in an intake pipe to the intake pressure sensor, by which detection accuracy by the intake pressure sensor can be improved, and a throttle system provided with this sensor unit.

To solve the above problems and to achieve the object, a throttle system according to the present invention includes: a throttle device provided to control intake airflow at an intake pipe connected to an internal combustion engine; and a sensor unit that is mounted on the throttle device, and including (i) a casing that is mounted on the throttle device and that constitutes the sensor unit, and ii) a pressure sensor chamber that is provided in the casing and that accommodates an intake pressure sensor to detect an intake pressure through the intake pipe. The pressure sensor chamber includes a pressure receiving area to receive a pressure in the intake pipe and a pressure detecting area to detect, by the intake pressure sensor, the pressure received by the pressure receiving area.

Moreover, in the above invention, a water reservoir portion to collect moisture generated in the pressure receiving area is formed in the pressure receiving area.

Moreover, in the above invention, the pressure sensor chamber includes a partition that divides the pressure sensor chamber into the pressure receiving area and the pressure detecting area such that the pressure receiving area communicates with the pressure detecting area through a predetermined communication portion. The water reservoir portion is formed with the partition.

Moreover, in the above invention, the pressure sensor chamber includes the partition that divides the pressure sensor chamber into the pressure receiving area and the pressure detecting area such that the pressure receiving area communicates with the pressure detecting area through the predetermined communication portion.

Moreover, in the above invention, the partition is formed by an O-ring.

Moreover, in the above invention, the communication portion is formed by a gap between a wall of the casing forming the pressure sensor chamber and an end of the partition.

Moreover, in the above invention, the communication portion has a size capable of regulating pulsation of a fluid passing through the communication portion.

Moreover, in the above invention, the communication portion is formed by a gap between a wall of the casing forming the pressure sensor chamber and an end of the partition.

Moreover, in the above invention, the pressure receiving area includes pressure receiving portions to which an opening of a pressure sampling passage through which the intake pipe and the pressure receiving area communicate with each other is opposed.

Moreover, in the above invention, a path from the pressure receiving portions to the intake pressure sensor through the communication portion is formed in a crank form.

Moreover, in the above invention, the pressure sampling passage is provided in the throttle device and includes at least an upstream passage portion located on an upstream side in an intake direction of the intake pipe and a downstream passage portion located on a downstream side in the intake direction of the intake pipe.

Moreover, in the above invention, the upstream passage portion and the downstream passage portion are arranged not in parallel with each other.

Moreover, in the above invention, an inner diameter of the upstream passage portion is set to be smaller than an inner diameter of the downstream passage portion.

Moreover, a sensor unit according to the present invention is mounted on a throttle device provided to control intake airflow at an intake pipe connected to an internal combustion engine. The sensor unit includes: a casing that is mounted on the throttle device and that constitutes the sensor unit; and a pressure sensor chamber that is provided in the casing and that accommodates an intake pressure sensor to detect an intake pressure through the intake pipe. The pressure sensor chamber includes a pressure receiving area to receive a pressure in the intake pipe and a pressure detecting area to detect, by the intake pressure sensor, the pressure received by the pressure receiving area.

According to the throttle system and the sensor unit of the present invention, it is possible to prevent a foreign substance from flowing to an intake pressure sensor when guiding air in an intake pipe to the intake pressure sensor, thereby improving detection accuracy by the intake pressure sensor.

DETAILED DESCRITPION OF THE INVENTION

An example of a throttle system and a sensor unit according to the present invention will be described below in detail based on the attached drawings. Note that the present invention is not limited by this example. The throttle system and the sensor unit according to the present invention can be used in an automobile or a motorcycle, for example.

Figure 1:
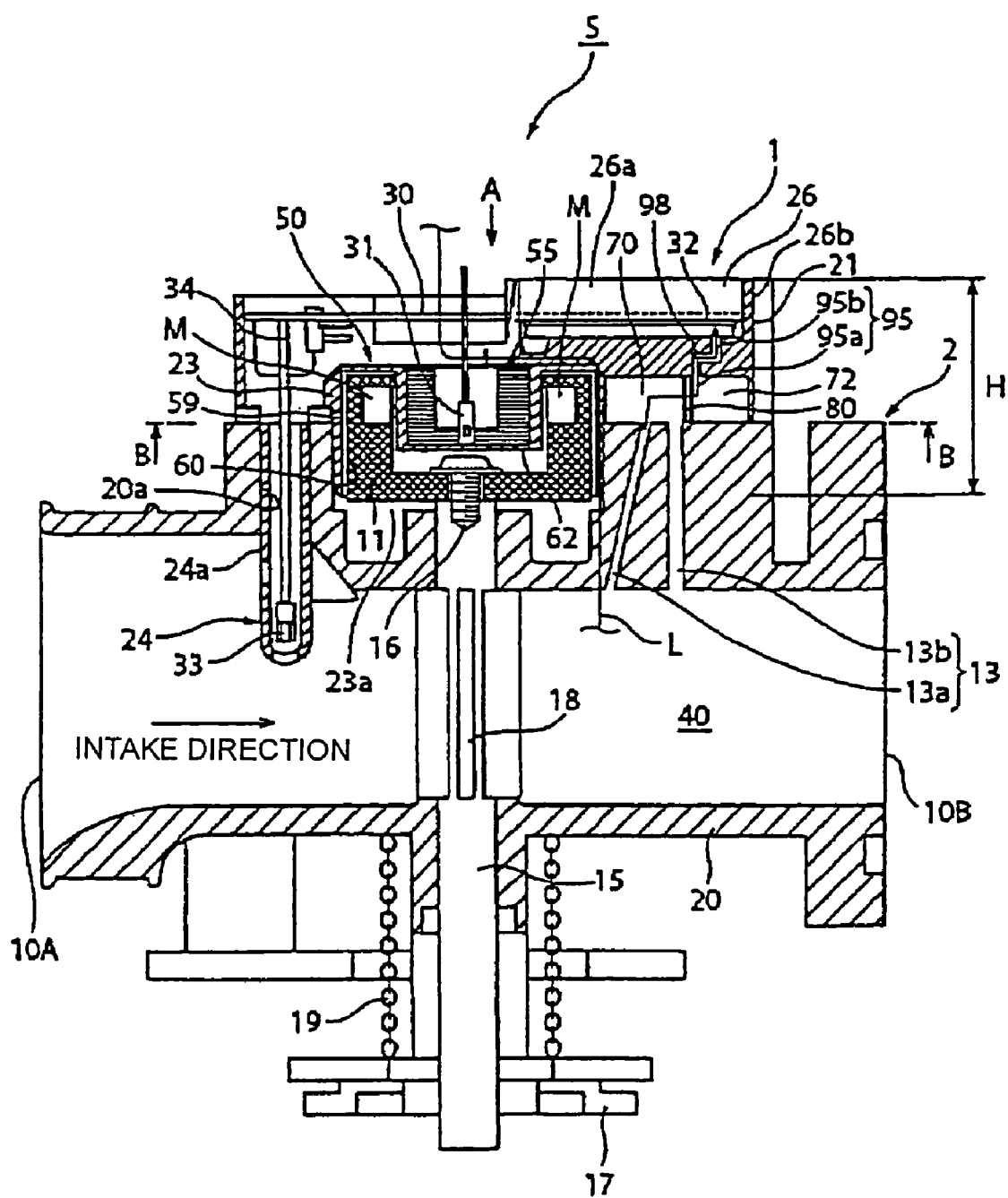
FIG. 1 is a cross sectional view of a throttle system according to an example of the present invention.
Figure 2:
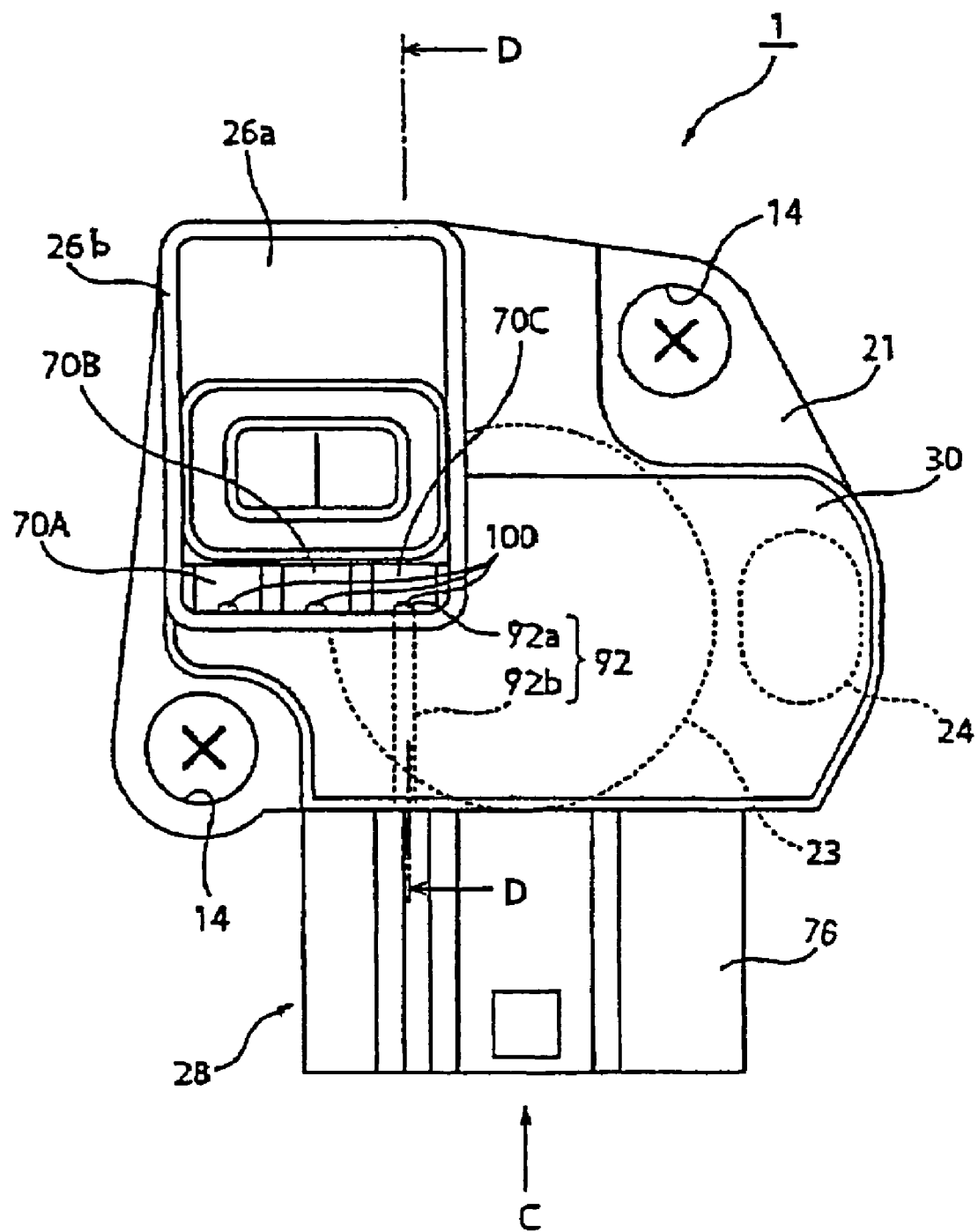
FIG. 2 is a plan view of a sensor unit viewed from an A direction shown in FIG. 1.
Figure 3:
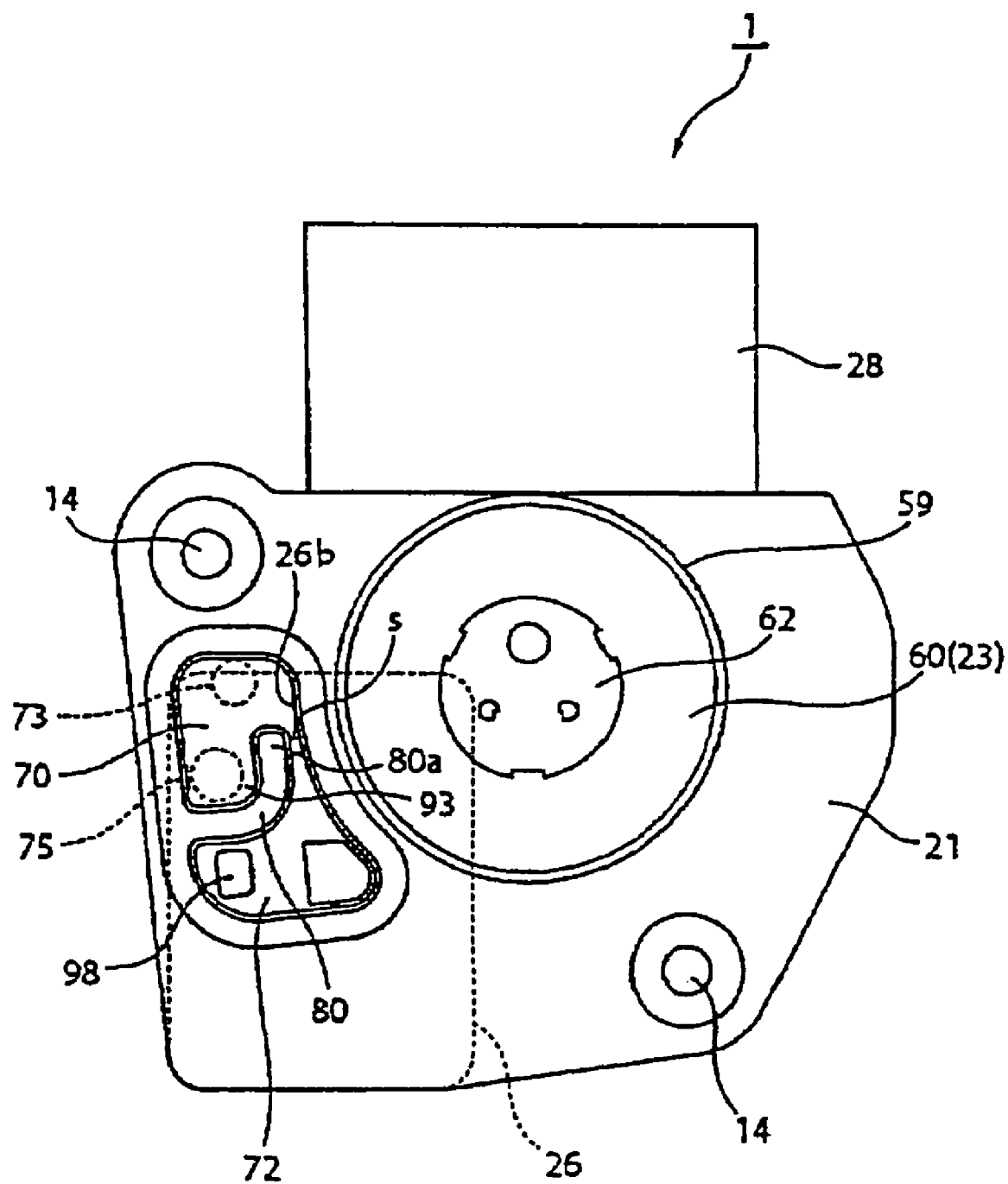
FIG. 3 is a plan view of a sensor unit viewed from a B direction shown in FIG. 1.

FIG. 1 is an illustration of a throttle system S including a sensor unit 1 and a throttle device 2 according to an example of the present invention. FIG. 2 is a plan view of the sensor unit 1 viewed from an A direction shown in FIG. 1. FIG. 3 is a plan view of the sensor unit 1 viewed from a B direction in FIG. 1. FIGS. 2 and 3 are illustrations of the sensor unit 1 according to this example removed from the throttle device 2.

As shown in FIG. 1, the sensor unit 1 is mounted on a side of a throttle body 20 near a throttle shaft 15 in the throttle device 2. In FIG. 1, the left side of the throttle shaft 15 represents an intake upstream side (air filter side), while the right side of the throttle shaft 15 indicates an intake downstream side (engine side).

The throttle body 20 is provided at an intake pipe not shown, which is formed in a cylindrical shape and connected to an internal combustion engine. The throttle body 20 is provided with an air horn 10A formed at the left end and a flange 10B at the right end. An outside air taken in through an air inlet is filtered by an air filter (not shown), and this filtered air is supplied from the air horn 10A side to the throttle device 2.

The throttle device 2 controls intake airflow to the engine by narrowing or widening a passage area of this filtered air, in other words, an opening degree of a throttle valve 18. Specifically, the throttle shaft 15 is provided substantially at the center on the side of the throttle body 20, and the throttle valve 18 that adjusts intake airflow is connected to this throttle shaft 15. The throttle device 2 adjusts the opening degree of the throttle valve 18 by rotationally moving the throttle shaft 15. The opening degree of this throttle valve 18 is detected by a non-contact-type position sensor (TPS) 50 provided with a hall element 31, for example, as described later.

As shown in FIG. 1, an intake temperature sensor 33 to detect an air temperature sucked through the intake pipe is arranged on the intake upstream side of the throttle valve 18, while an intake pressure sensor 32 to detect an air pressure sucked through the intake pipe is arranged on the downstream side of the throttle valve 18. Moreover, between the intake temperature sensor 33 and the intake pressure sensor 32, the above-mentioned TPS 50, which detects the opening degree of the throttle valve 18, is arranged. Here, the TPS 50, the intake pressure sensor 32, and the intake temperature sensor 33 are accommodated in predetermined space portions in a position sensor chamber 23, a pressure sensor chamber 26, and a temperature sensor chamber 24 provided at predetermined positions of a unit main body (casing) 21 of the sensor unit 1, respectively. The space portion of the pressure sensor chamber 26 to accommodate the intake pressure sensor 32 is, in this example, formed by a circumferential wall 26b in a rectangular frame form (explicitly shown in FIG. 2).

The unit main body (casing) 21 is formed by casting a molding material in a die with a predetermined shape, which will be described later. The unit main body (casing) 21 has a predetermined thickness H and is mounted on the throttle body 20 of the throttle device 2 in the thickness direction. When the unit main body 21 is mounted on the throttle body 20, each of the sensors 32, 33, and 50 is automatically positioned to a predetermined measurement position in the throttle device 2. Specifically, in the throttle body 20, a substantially-cylindrical fitting portion 60 is formed, and a substantially-cylindrical circumferential-wall portion 59 forming the position sensor chamber 23 is fitted in this fitting portion 60.

The temperature sensor chamber 24 is formed by a duct 24a projecting from the unit main body 21 with a length reaching an inner wall of the throttle body 20 of the throttle device 2, and this duct 24a is fitted into a through hole 20a provided in the throttle body 20. When the substantially-cylindrical circumferential-wall portion 59 of the position sensor chamber 23 and the duct 24a of the temperature sensor chamber 24 are fitted into the fitting portion 60 and the through hole 20a of the throttle body 20, respectively, the unit main body 21 is positioned with respect to the throttle device 2 around the throttle shaft 15, and each of the sensors 32, 33, and 50 is automatically positioned at the predetermined measurement position in the throttle device 2. In other words, the intake temperature sensor 33 is arranged at the predetermined position on the intake upstream side of the throttle valve 18, the intake pressure sensor 32 is arranged at the predetermined position on the intake downstream side of the throttle valve 18, and the TPS 50 is positioned at a predetermined valve detection position, which will be described later. At the unit main body 21, a screw hole 14 into which a screw to fix the unit main body 21 to the throttle body 20 is screwed is provided at two locations between which the TPS 50 is located (refer to FIGS. 2 and 3).

In this example, the position sensor chamber 23 and the pressure sensor chamber 26 have opening portions 23a, and 26a open oppositely to each other in a thickness H direction of the unit main body 21, respectively. Though not shown, the opening portion 26a of the pressure sensor chamber 26 is blocked by a cover not shown, by which the intake pressure sensor 32 is accommodated in the pressure sensor chamber 26 in a sealed state. Between the position sensor chamber 23 and the pressure sensor chamber 26, an electric line L connected to the TPS 50 and the intake pressure sensor 32 is arranged.

As shown in FIG. 1, a circuit board 30 is fixed and provided at a predetermined location inside the unit main body 21 of the sensor unit 1. The hall element 31 constituting the TPS 50 is directly mounted on the circuit board 30, and the intake pressure sensor 32 is electrically connected to the circuit board 30. Moreover, lead wire 34 from the intake temperature sensor 33 provided at the tip opening of the duct 24a of the temperature sensor chamber 24 is electrically connected to the circuit board 30. These elements (sensors) 31, 32, and 33 are electrically connected to or mounted on the circuit board 30 and are electrically connected to an electronic control circuit not shown, through a terminal of a connector 28 formed at the unit main body 21 (refer to FIGS. 2 and 3).

The TPS 50 includes a substantially annular magnet M fixed to the rotor 11 that rotationally moves with the throttle shaft 15 connected to the throttle valve 18, the hall element 31 to detect a change in a magnetic field caused by rotational movement of the rotor 11, and a substantially cylindrical stator 55 that is provided between the magnet M and the hall element 31 substantially concentrically with the magnet M and that forms a magnetic circuit to control the magnetic field around the hall element 31.

More specifically, the hall element 31 is arranged in a substantially cylindrical stator housing 62 formed at the unit main body 21. In this stator housing 62, the stator 55 made of a magnetic body formed in a predetermined shape is arranged in order to control the magnetic field around the hall element 31. To the throttle shaft 15, the rotor 11 constituting the TPS 50 is connected. The rotor 11 is fixed to the throttle shaft 15 through a screw 16 and rotationally moves integrally with the throttle shaft 15. The throttle shaft 15 pierces the throttle body 20 and runs across substantially at the center of the throttle body 20. The throttle shaft 15 piercing the throttle body 20 is connected to a throttle lever 17 at an end opposite to the rotor 11 side.

At the throttle shaft 15, the throttle valve 18 is mounted on a flow passage 40 in the throttle body 20 so that intake airflow through the flow passage 40 is adjusted according to a position (angle) of the throttle valve 18. In other words, the rotational angle of the rotor 11 is correlated to the opening degree of the throttle valve 18. At the throttle shaft 15, a return spring 19 is engaged through the throttle lever 17. At a part of an inner circumferential surface of the rotor 11, the magnet M is provided along the circumferential direction. This magnet M is arranged along an outer circumference of the stator housing 62 when the sensor unit 1 is attached to the throttle body 20.

Thus, the TPS 50 can detect the position of the throttle valve 18 by detecting with the hall element 31, a change in the magnetic field caused by rotational movement of the rotor 11 according to the position of the throttle valve 18.

As shown in FIG. 1, a pressure sampling passage 13 (13a and 13b) leading into the flow passage 40 of the throttle body 20 is formed in the throttle body 20. This pressure sampling passage 13 is open on a side of the throttle body 20 and forms a passage for intake pressure measurement to make the inside of the flow passage 40 of the throttle body 20 communicate with the intake pressure sensor 32 side of the sensor unit 1. The pressure sampling passage 13 includes an upstream passage portion 13a located on an upstream side in the intake pipe in the intake direction and a downstream passage portion 13b located on a downstream side in the intake pipe in the intake direction. The upstream passage portion 13a and the downstream passage portion 13b are arranged not in parallel with each other. Moreover, an inner diameter of the upstream passage portion 13a is set smaller than an inner diameter of the downstream passage portion 13b.

As shown in FIGS. 1 and 3, the pressure sensor chamber 26 has a pressure receiving area 70 to receive a pressure in the flow passage 40 (hence in the intake pipe) of the throttle body 20 on a face opposite to the throttle device 2 side, in other words, a face opposite to the pressure sampling passage 13 side, and a pressure detecting area 72 to detect, by the intake pressure sensor 32, the pressure received by the pressure receiving area 70. In the pressure detecting area 72, a through hole 98 is provided in a bent form communicating with the intake pressure sensor 32 provided on the face of the pressure sensor chamber 26 located on the side opposite to the pressure detecting area 72.

As shown in FIG. 3, the pressure receiving area 70 and the pressure detecting area 72 are separated from each other by a partition 80 with a section substantially in the L-shape. In this case, the partition 80 has a water reservoir portion 93 in a recess form to collect moisture generated in the pressure receiving area 70 formed on the pressure receiving area 70 side.

Figure 4A:
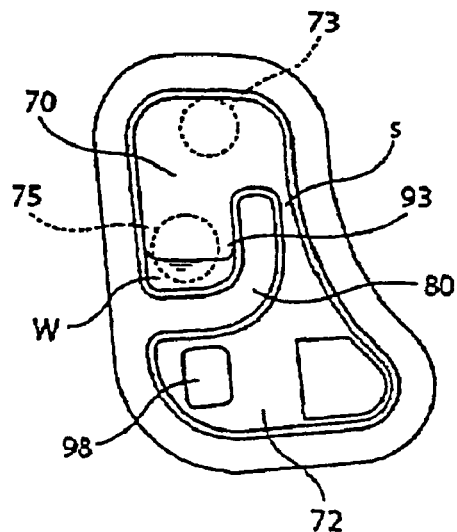
FIG. 4A is a partial plan view of a pressure sensor chamber showing a state where a pressure detecting area is located on a lower side and a pressure receiving area is located on an upper side.

FIG. 4A is a partial plan view of the pressure sensor chamber for illustrating a state where the pressure detecting area is located on a lower side, while the pressure receiving area is located on an upper side. As shown in FIG. 4A, when the sensor unit 1 is mounted on the throttle device 2 so that the pressure detecting area 72 is located on the lower side and the pressure receiving area 70 is located on the upper side, moisture W generated in the pressure receiving area 70 is collected in the water reservoir portion 93.

Figure 4B:
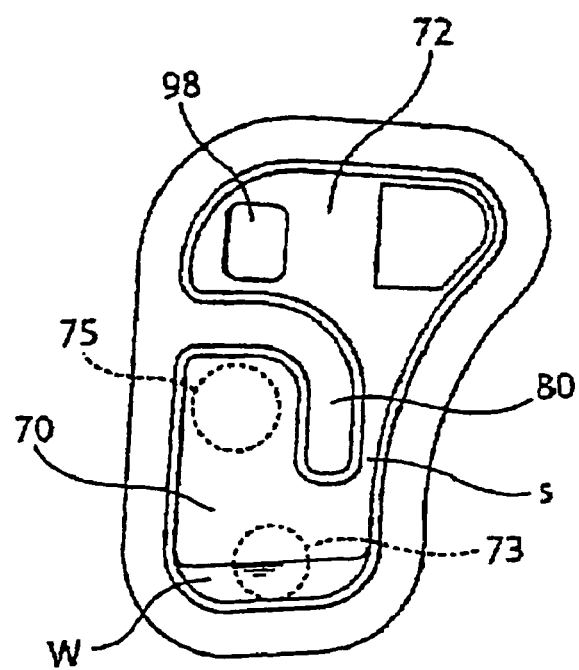
FIG. 4B is a partial plan view of a pressure sensor chamber showing a state where a pressure detecting area is located on an upper side and a pressure receiving area is located on a lower side.

FIG. 4B is a partial plan view of the pressure sensor chamber for illustrating a state where the pressure detecting area is located on the upper side, while the pressure receiving area is located on the lower side. As shown in FIG. 4B, when the sensor unit 1 is mounted on the throttle device 2 so that the pressure detecting area 72 is located on the upper side and the pressure receiving area 70 is located on the lower side, the moisture W generated in the pressure receiving area 70 is collected in a bottom portion of the pressure receiving area 70 due to action of gravity.

Moreover, the pressure detecting area 72 is made to communicate with the pressure receiving area 70 through a predetermined communication portion. In this example, the pressure detecting area 72 and the pressure receiving area 70 are made to communicate with each other through a gap (communication portion) s between the wall portion 26b of the unit main body 21 forming the pressure sensor chamber 26 and an end portion 80a of the partition 80. In this example, the gap s is limited to a predetermined size such that pulsation of a fluid passing through it can be regulated.

In this example, the pressure receiving area 70 has pressure receiving portions 73 and 75 to which opening of the respective passage portions 13a and 13b of the pressure sampling passage 13 are opposed, and a path 95 (refer to FIG. 1) leading from these pressure receiving portions 73 and 75 to the intake pressure sensor 32 through the communication portion s is formed in a crank form. Specifically, this path 95 includes a first crank-path portion 95a leading from the pressure receiving portions 73 and 75 to the through hole 98 and a second crank-path portion 95b formed by the through hole 98.

Figure 5:
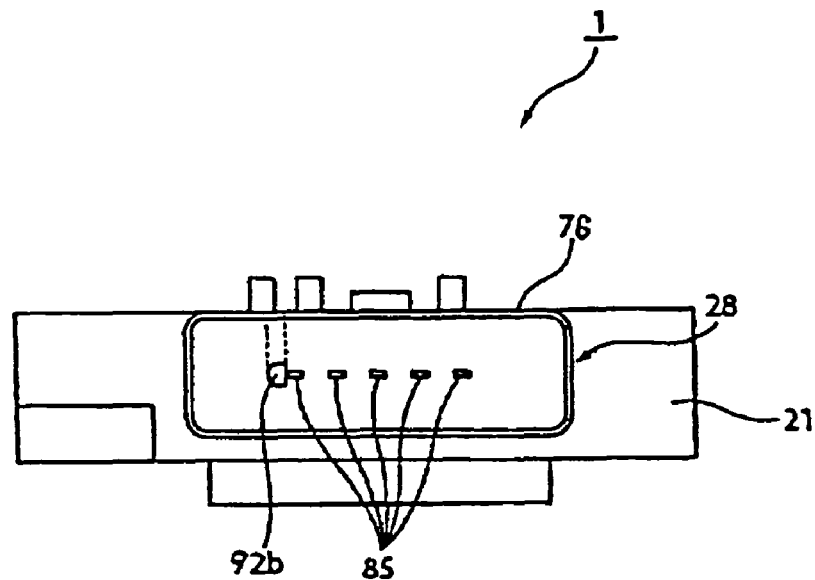
FIG. 5 is a view on arrow in a C direction shown in FIG. 2.

In this example, a connector 28 formed in the unit main body 21 has, as clearly shown in FIG. 5, an external connection terminal 85 to electrically connect the intake pressure sensor 32 accommodated in the pressure sensor chamber 26 to an external element, and a water-proof cover 76 that protects this external connection terminal 85 by surrounding the external connection terminal 85 and that extends in a predetermined direction by a predetermined length.

Figure 6:
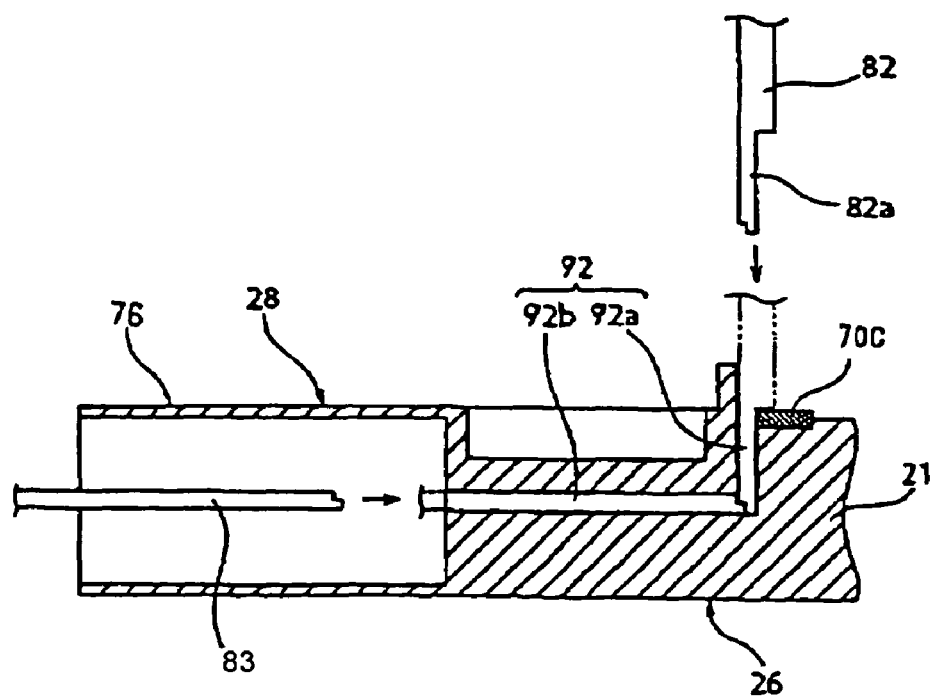
FIG. 6 is a cross sectional view along D-D line shown in FIG. 2.

As shown in FIGS. 2, 5 and 6, in the unit main body 21, an outside air passage 92 (see 92a and 92b) is formed to make inside of the pressure sensor chamber 26 (space defined by the circumferential wall 26b in which the intake pressure sensor 32 is arranged) communicate with an outside air through the connector 28. This outside air passage 92 includes a first passage 92b extending substantially linearly from the connector 28 toward the pressure sensor chamber 26 along the extending direction of the connector 28, and a second passage 92a communicating with this first passage 92b and extending in a direction substantially perpendicular to the first passage 92b. The first passage 92b is open in the connector 28, while the second passage 92a is open into the pressure sensor chamber 26 (space defined by the circumferential wall 26b in which the sensor 32 is arranged).

In the pressure sensor chamber 26, plural (three in this example) sensor connecting terminals 70A, 70B, and 70C to which the intake pressure sensor 32 is electrically connected are provided. These sensor connecting terminals 70A, 70B, and 70C are fixed to a terminal fixing portion 100 at an end wall of the pressure sensor chamber 26 located on the connector 28 side. Among these sensor connecting terminals 70A, 70B, and 70C, at the terminal fixing portion 100 to which the sensor connecting terminal 70C directly opposing the connector 28 side (therefore, capable of forming the linear first passage 92b with the connector 28, as described later) is fixed, for example, the second passage 92a extends as piercing the terminal fixing portion 100. The second passage 92a extends right near the sensor connecting terminal 70C perpendicularly toward the opening portion 26a of the pressure sensor chamber 26.

Next, an example of a method of forming the outside air passage 92 in accordance with die molding (casting) of the sensor unit 1 will be described in brief referring to FIG. 6. In order to facilitate the explanation, FIG. 6 is an illustration of a state where a die has been already removed, and the unit main body 21 has been molded from a molding material.

First, before casting the molding material into a die (not shown) in a predetermined shape for molding the unit main body 21, the sensor connecting terminals 70A, 70B, and 70C are positioned while being held using a predetermined shaped jig 82 in a predetermined area in the die for forming the pressure sensor chamber 26. At this time, as shown by a two-dot dashed line in FIG. 6, a linearly extending outside-air-passage forming portion 82a of the jig 82 is extended right near the sensor connecting terminal 70C as crossing the sensor connecting terminal 70C.

Next, in a predetermined area in the die for forming the connector 28, a pin 83 is positioned so that it is contact with an end of the outside-air-passage forming portion 82a of the jig 82. While the pin 83 and the jig 82 are positioned, a molding material is cast into the die. At a predetermined timing after that, the pin 83 and the jig 82 are removed from inside the die and then, the outside air passage 92 is formed to make the inside of the pressure sensor chamber 26 communicate with an outside air through the connector 28. The shape of an inner surface of the first passage 92b corresponds to an outside shape of the pin 83, and the shape of an inner surface of the second passage 92a corresponds to the outside shape of the outside-air-passage forming portion 82a of the jig 82.

As explained above, in the sensor unit 1 of this example, the pressure sensor chamber 26 has the pressure receiving area 70 to receive a pressure in the flow passage 40 of the throttle body 20 (thus, in the intake pipe) and the pressure detecting area 72 to detect, by the intake pressure sensor 32, the pressure received by the pressure receiving area 70, and the pressure receiving area 70 and the pressure detecting area 72 are divided from each other by the partition 80. Therefore, intrusion of a foreign substance from the pressure receiving area 70 into the pressure detecting area 72 is restricted by the partition 80, and such a situation that the detection accuracy by the intake pressure sensor 32 is reduced by the foreign substance can be prevented. Particularly, when a gasified fuel component in the intake pipe is sucked by the sensor unit 1, moisture is generated in the pressure receiving area 70 due to condensation and the like, but such moisture is prevented by the partition 80 from intruding into the pressure detecting area 72, and pressure measurement by the intake pressure sensor 32 is not badly affected.

In this example, the partition 80 is preferably formed by an O-ring. By forming the partition 80 by the O-ring in this way, intrusion of moisture generated in the pressure receiving area 70 into the pressure detecting area 72 side can be prevented more surely.

In the sensor unit 1 of this example, since the water reservoir portion 93 is formed on the pressure receiving area 70 side, moisture generated in the pressure receiving area 70 (moisture generated by condensation and the like when a gasified fuel component in the intake pipe is sucked by the sensor unit 1, for example) can be actively collected in the water reservoir portion 93, and intrusion of the moisture into the pressure detecting area 72 side can be prevented more effectively. In this example, since the water reservoir portion 93 is formed by the partition 80 dividing the pressure receiving area 70 and the pressure detecting area 72 from each other, the water reservoir portion 93 can be efficiently formed even in a small space of the sensor unit 1 by effectively using the partition 80.

The moisture-intrusion preventing effect to prevent intrusion of moisture from the pressure receiving area 70 to the pressure detecting area 72 is not affected by a mounting direction of the sensor unit 1 with respect to the throttle device 2. The moisture preventing effect is not affected by the mounting direction of the sensor unit 1 or by the state of a car body of an automobile (particularly, inclination thereof) on which the throttle system S including the sensor unit 1 is mounted. Even if the automobile is being driven in the inclined state or left as it is, for example, intrusion of moisture W into the pressure detecting area 72 side can be prevented. In the case of motorcycles, when a motorcycle makes a turn around a corner or a body of the motorcycle is fallen down and left as it is, intrusion of moisture W into the pressure detecting area 72 side can be also prevented.

In other words, as shown in FIG. 4B, when the sensor unit 1 is mounted on the throttle device 2 so that the pressure detecting area 72 is located on the upper side and the pressure receiving area 70 is located on the lower side, the moisture W generated in the pressure receiving area 70 is collected at the bottom portion of the pressure receiving area 70 by action of gravity, and the moisture W will not intrude from the pressure receiving area 70 into the pressure detecting area 72 side. On the other hand, as shown in FIG. 4A, when the sensor unit 1 is mounted on the throttle device 2 so that the pressure detecting area 72 is located on the lower side and the pressure receiving area 70 is located on the upper side, the moisture W generated in the pressure receiving area 70 is collected in the water reservoir portion 93 and prevented from intruding into the pressure detecting area 72 side by the force of gravity.

In the sensor unit 1 of this example, the pressure receiving area 70 and the pressure detecting area 72 are made to communicate with each other through the gap s between the wall portion 26a of the unit main body 21 forming the pressure sensor chamber 26 and the end portion 80a of the partition 80, and pulsation of a fluid from the pressure receiving area 70 to the pressure detecting area 72 is regulated by limiting the size of this communication portion s. Therefore, efficient and effective pulsation control is possible, and measurement accuracy by the intake pressure sensor 32 can be improved.

Moreover, in the sensor unit 1 of this example, the path 95 leading from the pressure receiving portions 73 and 75 toward the intake pressure sensor 32 through the communication portion s is formed in the crank form. Therefore, the fluid from the intake pipe flows from the pressure receiving area 70 to the intake pressure sensor 32 through the pressure detecting area 72 and the through hole 98 in the crank form. Therefore, the pulsation of the fluid is effectively regulated, and the measurement accuracy by the intake pressure sensor 32 can be improved.

In the throttle device 2 of this example, since the pressure sampling passage 13 is formed by the two passage portions 13a and 13b separated along the intake direction, a differential pressure can be generated between the passage portions 13a and 13b. Therefore, while sampling a pressure in the intake pipe through the pressure sampling passage 13, a foreign substance (gasified fuel component, for example) in the intake pipe sucked into the pressure receiving area 70 of the sensor unit 1 through the upstream passage portion (passage portion with higher intake pressure) 13a can be discharged into the intake pipe again through the downstream passage portion (passage portion with lower intake pressure) 13b. In other words, an effect of scavenging (purging) the foreign substance during intake pressure measurement can be improved. In this construction, the larger the distance between the two passage portions 13a and 13b forming the pressure sampling passage 13 is, the larger the differential pressure generated between the passage portions 13a and 13b gets, thereby, improving the purge effect.

By providing the water reservoir portion 93 in the pressure receiving area 70 and by providing the two passage portions 13a and 13b separated from each other in the intake direction with a pressure difference so as to communicate with the pressure receiving area 70 as in this example, the moisture collected in the water reservoir portion 93 of the partition 80 can be effectively discharged into the intake pipe by the purge effect by the two passage portions 13a and 13b. Specifically, if a negative pressure is generated at the start of an engine, for example, the moisture collected in the water reservoir portion 93 can be sucked and discharged into the intake pipe through the downstream passage portion 13b.

Moreover, in this example, since the upstream passage portion 13a and the downstream passage portion 13b are arranged not in parallel with each other, even if the two passage portions 13a and 13b are close to each other, the differential pressure between the passage portions 13a and 13b can be ensured large. In other words, by providing the upstream passage portion 13a and the downstream passage portion 13b not in parallel with each other and by largely separating the opening portions of the passage portions 13a and 13b open from each other in the intake pipe along the intake direction, even if the two passage portions 13a and 13b are made close to each other to reduce the size of the sensor unit 1, for example, the differential pressure between the passage portions 13a and 13b can be ensured large, and an effective purge effect can be maintained.

Moreover, in this example, since the inner diameter of the upstream passage portion 13a is set smaller than the inner diameter of the downstream passage portion 13b, even if the distance between the two passage portions 13a and 13b is not ensured large, the differential pressure between the passage portions 13a and 13b can be increased.

In the sensor unit 1 of this example, the second passage 92a of the outside air passage 92 extends near the sensor connecting terminal 70C, piercing the terminal fixing portion 100 of the pressure sensor chamber 26 to which the sensor connecting terminal 70C is fixed. By providing the second passage 92a at this position, when the unit main body 1 is formed by casting a molding material into a die as in this example, the second passage 92a can be formed using a part of the jig 82 (outside-air-passage forming portion 82a) holding the sensor connecting terminals 70A, 70B, and 70C within the die. In other words, in the insert molding in which the sensor connecting terminals 70A, 70B, and 70C are set in the die in advance and the molding material is cast, the jig 82 for holding the sensor connecting terminals can be also used as a part for forming the second passage (pin or the like). Therefore, the number of processes and maintenance of the die can be reduced, and facilitation of molding work and reduction of manufacturing costs can be promoted.

Moreover, by forming the second passage 92a near the sensor connecting terminal 70C in this way, effective use of an existing narrow thick portion in the unit main body 21 can be realized (since a space is not wasted any more). Therefore, size reduction of the entire sensor unit can be realized in the end.

According to this example, the first passage 92b is substantially linearly extended from the connector 28 to the pressure sensor chamber 26 along the extending direction of the connector 28 and open in the connector 28, while the second passage 92a is extended substantially crossing the first passage 92b and open in the pressure sensor chamber 26. In other words, since the outside air passage 92 is formed by the two passage portions 92a and 92b substantially crossing each other, the passage construction of the outside air passage 92 is simplified, and formation of the passage is facilitated.

Moreover, according to this example, the inside of the pressure sensor chamber 26 is made to communicate with the outside air using the existing connector 28 which can communicate with the outside air. If the inside of the pressure sensor chamber 26 is made to communicate with the outside air using the existing atmospheric chamber, which is the inside of the connector 28, in other words, if the inside of the pressure sensor chamber 26 is made to communicate with the outside air by effectively and efficiently using the existing space of the connector 28, a space required for outside air communication can be minimized in the unit main body 21, which can accomplish size reduction of the entire sensor unit.

Moreover, according to this example, the inside of the pressure sensor chamber 26 is made to communicate with the outside air through a water-proof cover 76. In other words, the inside of the pressure sensor chamber 26 is made to communicate with a water-proof atmospheric chamber through the outside air passage 92. Therefore, intrusion of water into the intake pressure sensor 32 through the outside air passage 92 can be prevented, and reduction of measurement accuracy caused by adhesion of moisture to the intake pressure sensor 32 (bad influence of moisture on pressure measurement of the intake pressure sensor 32) can be avoided.

Moreover, according to this example, the second passage 92a can be formed using the jig 82 holding the sensor connecting terminals 70A, 70B, and 70C within the die. In other words, only by a work of inserting the jig 82 in the die and then, removing this jig 82 from within the die (normal work to hold the sensor connecting terminals 70A, 70B, and 70C and release thereof), the second passage 92a can be formed at the same time.

Moreover, according to this example, since the second passage 92a can be formed by inserting the jig 82 from the opening portion 26a side of the pressure sensor chamber 26 into the die substantially perpendicularly, insertion/removal characteristic of the jig 82 with respect to the die is improved, and moreover, since the jig 82 can be pressed onto the sensor connecting terminals 70A, 70B, and 70C from above, holding characteristics of the sensor connecting terminals 70A, 70B, and 70C by the jig 82 are also made favorable.

The throttle system and the sensor unit according to the present invention can be applied to any sensor unit integrally incorporating a sensor, and a throttle system provided with the sensor unit.

The invention claimed is:

1. A throttle system comprising:
    a throttle device for controlling intake airflow of an intake pipe connected to an internal combustion engine; and
    a sensor unit mounted on the throttle device, and including:
        a casing mounted on the throttle device; and
        a pressure sensor chamber located in the casing and accommodating an intake pressure sensor for detecting an intake pressure through the intake pipe,
    wherein the pressure sensor chamber includes:
        a pressure receiving area that receives a pressure in the intake pipe through a pressure sampling passage of the throttle device;
        a pressure detecting area that detects the pressure via the intake pressure sensor;
        a water reservoir portion that collects moisture generated in the pressure receiving area; and
        a curved partition that divides the pressure receiving area and the pressure detecting area,
    wherein the pressure receiving area of the sensor unit mounted on the throttle device is positioned to face an external surface of the throttle device on which the sensor unit is mounted,
    wherein the water reservoir portion is formed to face the external surface of the throttle device on which the sensor unit is mounted and is formed in the pressure receiving area, and
    wherein the pressure receiving area is arranged to communicate with the pressure detecting area through a communication portion that is positioned to face the external surface of the throttle device on which the sensor unit is mounted.

2. The throttle system according to claim 1,
    wherein the curved partition divides the pressure sensor chamber into the pressure receiving area and the pressure detecting area, such that the pressure receiving area communicates with the pressure detecting area through the communication portion, and
    wherein the water reservoir portion is formed with the curved partition.

3. The throttle system according to claim 1, wherein the curved partition divides the pressure sensor chamber into the pressure receiving area and the pressure detecting area, such that the pressure receiving area communicates with the pressure detecting area through the communication portion.

4. The throttle system according to claim 2, wherein the curved partition is formed by an O-ring.

5. The throttle system according to claim 2, wherein the communication portion is formed by a gap between a wall of the casing forming the pressure sensor chamber and an end of the curved partition.

6. The throttle system according to claim 2, wherein the communication portion has a size capable of regulating a pulsation of a fluid passing therethrough the communication portion.

7. The throttle system according to claim 6, wherein the communication portion is formed by a gap between a wall of the casing forming the pressure sensor chamber and an end of the curved partition.

8. The throttle system according to claim 1, wherein the pressure receiving area includes a pressure receiving portion to which an opening of the pressure sampling passage, through which the intake pipe and the pressure receiving area communicate with each other, is opposed.

9. The throttle system according to claim 8, wherein a path from the pressure receiving portion to the intake pressure sensor through the communication portion is formed in a crank form.

10. The throttle system according to claim 8, wherein the pressure sampling passage is provided in the throttle device and includes at least an upstream passage portion located on an upstream side in an intake direction of the intake pipe and a downstream passage portion located on a downstream side in the intake direction of the intake pipe.

11. The throttle system according to claim 10, wherein the upstream passage portion and the downstream passage portion are not parallel to each other.

12. The throttle system according to claim 10, wherein an inner diameter of the upstream passage portion is smaller than an inner diameter of the downstream passage portion.

13. A sensor unit mounted on a throttle device that controls intake airflow of an intake pipe connected to an internal combustion engine, the sensor unit comprising:
    a casing mounted on the throttle device; and
    a pressure sensor chamber located in the casing and accommodating an intake pressure sensor that detects an intake pressure through the intake pipe,
    wherein the pressure sensor chamber includes:
        a pressure receiving area that receives a pressure in the intake pipe through a pressure sampling passage;
        a pressure detecting area that detects the pressure via the intake pressure sensor;
        a water reservoir portion that collects moisture generated in the pressure receiving area; and
        a curved partition that divides the pressure receiving area and the pressure detecting area,
    wherein the pressure receiving area of the sensor unit mounted on the throttle device is positioned to face an external surface of the throttle device on which the sensor unit is mounted,
    wherein the water reservoir portion is formed to face the external surface of the throttle device on which the sensor unit is mounted and is formed in the pressure receiving area, and
    wherein the pressure receiving area is arranged to communicate with the pressure detecting area through a communication portion that is positioned to face the external surface of the throttle device on which the sensor unit is mounted.

14. The throttle system according to claim 1, wherein the curved partition dividing the pressure receiving area and the pressure detecting area (i) forms the water reservoir portion, such that the water reservoir portion is formed in an inner curve portion of the curved partition, and (ii) forms the communication portion providing communication between the pressure receiving area and the pressure detecting area.

* * * * *